United States Patent
Fukuda et al.

(10) Patent No.: US 9,711,783 B2
(45) Date of Patent: Jul. 18, 2017

(54) NEGATIVE ELECTRODE FOR NONAQUEOUS ELECTROLYTE SECONDARY BATTERY AND NONAQUEOUS ELECTROLYTE SECONDARY BATTERY

(71) Applicants: SANYO Electric Co., Ltd., Daito-shi, Osaka (JP); Panasonic Corporation, Kadoma-shi, Osaka (JP)

(72) Inventors: Kazuto Fukuda, Aichi (JP); Ayano Toyoda, Osaka (JP); Shouichiro Sawa, Tokushima (JP); Taizou Sunano, Hyogo (JP)

(73) Assignees: SANYO Electric Co., Ltd., Daito-shi (JP); PANASONIC Corporation, Kadoma-shi (JP)

( * ) Notice: Subject to any disclaimer, the term of this patent is extended or adjusted under 35 U.S.C. 154(b) by 52 days.

(21) Appl. No.: 14/762,961

(22) PCT Filed: Jan. 10, 2014

(86) PCT No.: PCT/JP2014/000080
§ 371 (c)(1),
(2) Date: Jul. 23, 2015

(87) PCT Pub. No.: WO2014/119229
PCT Pub. Date: Aug. 7, 2014

(65) Prior Publication Data
US 2015/0364752 A1 Dec. 17, 2015

(30) Foreign Application Priority Data

Jan. 30, 2013 (JP) ................................. 2013-016082
Mar. 22, 2013 (JP) ................................. 2013-059362

(51) Int. Cl.
*H01M 4/02* (2006.01)
*H01M 4/134* (2010.01)
(Continued)

(52) U.S. Cl.
CPC .......... *H01M 4/134* (2013.01); *H01M 4/386* (2013.01); *H01M 4/622* (2013.01);
(Continued)

(58) Field of Classification Search
CPC ...... H01M 4/134; H01M 4/622; H01M 4/386; H01M 10/052; H01M 2004/027; H01M 2004/025; H01M 2004/021; Y02E 60/122
See application file for complete search history.

(56) References Cited

U.S. PATENT DOCUMENTS

2004/0072067 A1* 4/2004 Minami .............. H01M 4/0419
429/212
2009/0123840 A1 5/2009 Shirane et al.
(Continued)

FOREIGN PATENT DOCUMENTS

JP 2003-303586 A 10/2003
JP 2004-103474 A 4/2004
(Continued)

OTHER PUBLICATIONS

International Search Report dated Apr. 8, 2014, issued in counterpart Application No. PCT/JP2014/000080 (2 pages).
(Continued)

*Primary Examiner* — Cynthia K Walls
(74) *Attorney, Agent, or Firm* — Westerman, Hattori, Daniels & Adrian, LLP (57) ABSTRACT

A negative electrode for a nonaqueous electrolyte secondary battery according to one aspect of the present invention includes a negative electrode mixture layer that contains a binder and a negative electrode active material particle that forms an alloy with lithium and is formed on a current collector. The negative electrode mixture layer includes a base portion near the current collector and pillar-shaped portions formed on the base portion. A negative electrode for a nonaqueous electrolyte secondary battery according to (Continued)

another aspect of the present invention includes a negative electrode mixture layer that contains a binder and a negative electrode active material particle that forms an alloy with lithium and is formed on a current collector. The negative electrode mixture layer includes pillar-shaped portions and the particle diameter of the negative electrode active material particle is 20% or less of the maximum diameter of the pillar-shaped portions.

20 Claims, 2 Drawing Sheets

(51) Int. Cl.
  *H01M 4/38*     (2006.01)
  *H01M 4/62*     (2006.01)
  *H01M 10/052*   (2010.01)
(52) U.S. Cl.
  CPC .... *H01M 10/052* (2013.01); *H01M 2004/021* (2013.01); *H01M 2004/025* (2013.01); *H01M 2004/027* (2013.01)

(56) References Cited

U.S. PATENT DOCUMENTS

| | | | |
|---|---|---|---|
| 2010/0151321 A1 | 6/2010 | Yamamoto et al. | |
| 2011/0027650 A1* | 2/2011 | Yamamoto | H01M 4/134 |
| | | | 429/218.1 |

FOREIGN PATENT DOCUMENTS

| | | |
|---|---|---|
| JP | 2004-179136 A | 6/2004 |
| JP | 2007-157704 A | 6/2007 |
| JP | 2009-152189 A | 7/2009 |
| WO | 2007/74654 A1 | 7/2007 |

OTHER PUBLICATIONS

Written Opinion dated Apr. 8, 2014, issued in counterpart application No. PCT/JP2014/000080 (8 pages).

* cited by examiner

NEGATIVE ELECTRODE FOR NONAQUEOUS ELECTROLYTE SECONDARY BATTERY AND NONAQUEOUS ELECTROLYTE SECONDARY BATTERY

TECHNICAL FIELD

The present invention relates to a negative electrode for nonaqueous electrolyte secondary batteries and a nonaqueous electrolyte secondary battery that uses the negative electrode.

BACKGROUND ART

In order to increase the energy density and output of nonaqueous electrolyte secondary batteries, a study on using, as a negative electrode active material, a material that forms an alloy with lithium, such as silicon, germanium, tin, or zinc, instead of a carbon material such as graphite has been conducted. However, a negative electrode that uses a material containing silicon or the like as a negative electrode active material undergoes considerable volume expansion or shrinkage during occlusion and release of lithium. Therefore, in nonaqueous electrolyte secondary batteries including a negative electrode that uses a material containing silicon as a negative electrode active material, swelling of cells, formation of fine powder of a negative electrode active material, and detachment of a negative electrode active material from a current collector by stress occur as the charge-discharge cycle proceeds, which results in degradation of cycle characteristics.

PTL 1 below discloses a nonaqueous electrolyte secondary battery that uses a negative electrode obtained by forming a plurality of pillar-shaped protruding portions on a thin film that is made of a negative electrode active material such as silicon and deposited on a negative electrode current collector. The plurality of pillar-shaped protruding portions are made of a negative electrode active material such as silicon and have a larger thickness than portions around the protruding portions.

The negative electrode in the nonaqueous electrolyte secondary battery disclosed in PTL 1 below is obtained by forming a silicon thin film serving as a base layer on a surface of a negative electrode current collector by a sputtering method and furthermore forming pillar-shaped protruding portions made of silicon on the surface of the silicon thin film by a lift-off method including sputtering and etching in a combined manner. The negative electrode has cavities that absorb the volume expansion of the negative electrode active material during charging and discharging around the pillar-shaped protruding portions, whereby the swelling of cells is suppressed and a large stress is prevented from being applied to the negative electrode current collector.

CITATION LIST

Patent Literature

PTL 1: Japanese Published Unexamined Patent Application No. 2003-303586

SUMMARY OF INVENTION

Technical Problem

In the nonaqueous electrolyte secondary battery that uses the negative electrode disclosed in PTL 1, wrinkling caused on the negative electrode current collector by charging and discharging is suppressed, the swelling of cells is small, and the volumetric energy density is high. In the nonaqueous electrolyte secondary battery that uses the negative electrode disclosed in PTL 1 above, however, further improvements can be made in cycle characteristics and the structure of the negative electrode.

Solution to Problem

A negative electrode for a nonaqueous electrolyte secondary battery according to one aspect of the present invention includes a current collector and a negative electrode mixture layer formed on the current collector and containing a binder and a negative electrode active material particle that forms an alloy with lithium. The negative electrode mixture layer includes pillar-shaped portions, and the pillar-shaped portions are formed on a base portion near the current collector.

A negative electrode for a nonaqueous electrolyte secondary battery according to another aspect of the present invention includes a current collector and a negative electrode mixture layer formed on the current collector and containing a binder and a negative electrode active material particle that forms an alloy with lithium. The negative electrode mixture layer includes pillar-shaped portions, and the particle diameter of the negative electrode active material particle is 20% or less of the maximum diameter of the pillar-shaped portions.

Advantageous Effects of Invention

In the negative electrode for a nonaqueous electrolyte secondary battery according to one aspect of the present invention and the negative electrode for a nonaqueous electrolyte secondary battery according to another aspect of the present invention, the negative electrode mixture layer contains a binder and a negative electrode active material particle that forms an alloy with lithium. Therefore, even if the negative electrode active material particle expands during charging and discharging, the expansion is absorbed by cavities formed between the pillar-shaped portions of the negative electrode mixture layer. This also decreases the stress applied to the negative electrode current collector. Furthermore, even if the negative electrode active material particle expands or shrinks, the bonds between the negative electrode active material particles and between the negative electrode active material and the current collector are maintained by the binder. Therefore, the electron conductivity between the negative electrode active material particles and the electron conductivity between the negative electrode active material and the current collector are maintained. Thus, a nonaqueous electrolyte secondary battery having a high capacity retention ratio is obtained.

Furthermore, in the negative electrode for nonaqueous electrolyte secondary batteries according to another aspect of the present invention, the particle diameter of the negative electrode active material particle is 20% or less of the maximum diameter of the pillar-shaped portions. Therefore, good moldability of the pillar-shaped portions in the negative electrode mixture layer is achieved. Thus, the pillar-shaped structure of the negative electrode mixture layer is satisfactorily formed and the density can also be increased. Consequently, even if the negative electrode active material particle expands or shrinks during charging and discharging, the percentage of expansion or shrinkage is small. Furthermore, since there are many contacts between the negative electrode active material particles, good initial cycle characteristics are achieved.

DESCRIPTION OF EMBODIMENTS

Hereafter, an embodiment of the present invention will be described in detail on the basis of Experimental Examples. The following Experimental Examples merely show one example of the negative electrode for nonaqueous electrolyte secondary batteries that realize the technical idea of the present invention. The present invention is not intended to be limited to any of Experimental Examples, and the present invention is equally applicable to various modifications without departing from the technical idea provided in the claims. The drawings referred to in the description of the embodiments are schematically illustrated. For example, the dimensional ratio of an element illustrated in the drawings may be different from that of the actual element. The specific dimensional ratio or the like should be judged in consideration of the following description.

EXPERIMENT 1

Experimental Example 1

(Preparation of Negative Electrode Mixture Slurry)

A negative electrode mixture slurry used in Experimental Example 1 was prepared by mixing silicon particles having an average particle diameter ($D_{50}$) of 2.3 μm and serving as a negative electrode active material, a graphite powder having an average particle diameter ($D_{50}$) of 3 μm and serving as a negative electrode conductive material, and a polyamic acid resin which is a precursor of a polyimide resin and serves as a negative electrode binder using N-methyl-pyrrolidone (NMP) as a dispersion medium. The mass ratio of the materials in the mixing was 85:3:12, and the solid content of the slurry was 47 mass %.

(Production of Negative Electrode)

The prepared negative electrode mixture slurry was applied in a solid manner onto an electrolytically roughened surface of a copper alloy foil (C7025 alloy foil, composition: Cu 96.2 mass %, Ni 3 mass %, Si 0.65 mass %, and Mg 0.15 mass %) having a thickness of 18 μm and serving as a negative electrode current collector using a glass substrate applicator in the air at 25° C., and dried. The surface roughness Ra (JIS B 0601-1994) of the copper alloy foil was 0.25 μm, and the average distance between local peaks S (JIS B 0601-1994) of the surface of the copper alloy foil was 0.85 μm.

A heat treatment was then conducted at 400° C. for 10 hours to convert the polyamic acid resin into a polyimide resin and to perform sintering. Subsequently, the sintered product was cut into a size of 20×27 mm$^2$, and then a Ni plate serving as a collector terminal was attached thereto to produce a negative electrode of Experimental Example 1. The density of the negative electrode mixture layer in the negative electrode of Experimental Example 1 was 1.13 g/cm$^3$.

Experimental Example 2

The prepared negative electrode mixture slurry was applied in a solid manner onto a surface of the copper alloy foil using a glass substrate applicator in the same manner as in Experimental Example 1 so as to have the same thickness as in Experimental Example 1, and dried. Subsequently, a negative electrode of Experimental Example 2 was produced in the same manner as in the negative electrode of Experimental Example 1, except that the density of the negative electrode mixture layer was increased by rolling. The density of the negative electrode mixture layer in the negative electrode of Experimental Example 2 was 1.86 g/cm$^3$.

Experimental Example 3

The prepared negative electrode mixture slurry was applied onto a surface of the same copper alloy foil as in Experimental Example 1 using a glass substrate applicator so as to have the same thickness as in Experimental Example 1 and then semidried in a drying oven so that the NMP was left. A die including a plurality of pores formed thereon (pore size: 50 μm, pitch between pores: 70 μm, depth of pores: 36 μm, and distance between pores: 20 μm) was pressed against the surface of the semidried negative electrode mixture layer to perform molding. Then, the negative electrode mixture layer was completely dried. The plurality of pores are arranged in a staggered manner. A heat treatment was then conducted at 400° C. for 10 hours to convert the polyamic acid resin into a polyimide resin and to perform sintering. The sintered product was cut into a size of 20×27 mm$^2$, and then a Ni plate serving as a collector terminal was attached thereto to produce a negative electrode of Experimental Example 3. The mixture density of the entire negative electrode mixture layer in the negative electrode of Experimental Example 3 was 1.22 g/cm$^3$. The mixture density in the negative electrode of Experimental Example 3 was calculated without the spatial volume between the formed pillar-shaped portions. The thickness of a base portion in the negative electrode of Experimental Example 3 was 10 μm. The specific structure of the negative electrode of Experimental Example 3 will be described later.

(Preparation of Nonaqueous Electrolytic Solution)

Fluoroethylene carbonate (FEC) and methyl ethyl carbonate (MEC) were mixed at a volume ratio (FEC:MEC) of 2:8 in an argon atmosphere. Subsequently, lithium hexafluorophosphate (LiPF$_6$) was dissolved in the mixed solvent so as to have a concentration of 1 mol/L to prepare a nonaqueous electrolytic solution used for each of Experimental Examples 1 to 3.

(Production of Monopolar Cell)

Figure 1:
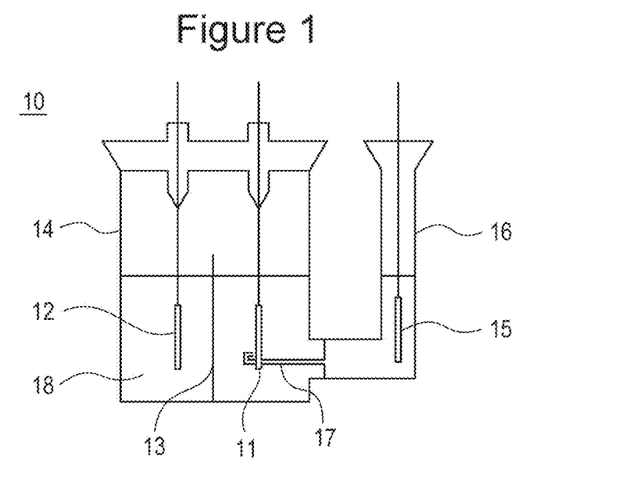
FIG. 1 schematically illustrates a monopolar cell used in Experimental Examples 1 to 8.

A lithium foil serving as a counter electrode (positive electrode) to which a nickel plate was attached as a terminal was disposed so as to face the produced negative electrode of each of Experimental Examples 1 to 3 with a separator disposed therebetween. They were sandwiched between a pair of glass substrates and immersed in the nonaqueous electrolytic solution. A lithium foil to which a nickel plate was attached as a terminal was used as a reference electrode. FIG. 1 schematically illustrates a monopolar cell 10.

The monopolar cell 10 illustrated in FIG. 1 includes a measurement cell 14 in which a negative electrode 11, a counter electrode (positive electrode) 12, and a separator 13 are disposed and a reference electrode cell 16 in which a reference electrode 15 is disposed. A capillary 17 extends from the reference electrode cell 16 to near the surface of the positive electrode 11. The measurement cell 14 and the reference electrode cell 16 are each filled with a nonaqueous electrolytic solution 18. In the actually produced monopolar cell 10, the negative electrode 11 of each of Experimental Examples 1 to 8, the separator 13, and the positive electrode (counter electrode) 12 are integrally sandwiched between a pair of glass substrates (not illustrated). However, the negative electrode 11, the separator 13, and the positive electrode (counter electrode) 12 are schematically illustrated in FIG. 1 in a separated manner in order to clearly show the measurement principle.

(Measurement of Monopolar Characteristics)

A charge-discharge cycle test was performed on the monopolar cell corresponding to the produced negative electrode of each of Experimental Examples 1 to 3 under the following conditions. First, charging was performed at a constant current of 0.3 mA until the voltage reached 110 mV vs. Li/Li$^+$, and the quantity of electricity that flowed herein was determined as an initial charge capacity. Furthermore, the thickness of the negative electrode mixture layer in the negative electrode of each of Experimental Examples 1 to 3 after the initial charging was measured with a micrometer. The state of charge in the negative electrode of each of Experimental Examples 1 to 3 was determined on the basis of the calculation formula below using the initial charge capacity. Since lithium can be intercalated into silicon up to the composition $Li_{4.4}Si$, the theoretical capacity of silicon is 4200 mAh/g.

State of charge(%)

=(initial charge capacity/(theoretical capacity of silicon×mass of negative electrode active material))×100

=(initial charge capacity/(4200×mass of negative electrode active material))×100

Subsequently, discharging was performed at a constant current of 0.3 mA until the voltage reached 1000 mV vs. Li/Li$^+$, and the quantity of electricity that flowed herein was determined as an initial discharge capacity. Furthermore, the thickness of the negative electrode mixture layer in the negative electrode of each of Experimental Examples 1 to 3 after the initial discharging was measured with a microm-eter. The expansion percentage and the initial efficiency were determined on the basis of the calculation formula below.

Expansion percentage(%)

=(thickness of negative electrode mixture layer after initial charging/thickness of negative electrode mixture layer after initial discharging)×100

Initial efficiency(%)

=(initial discharge capacity/initial charge capacity)×100

Furthermore, the monopolar cell of each of Experimental Examples 1 to 3 in which the initial discharge capacity was measured was subjected to charging and discharging under the same charge-discharge conditions as the initial charge-discharge conditions to determine the third-cycle discharge capacity. The capacity retention ratio was calculated on the basis of the calculation formula below.

Capacity retention ratio(%)

=(third-cycle discharge capacity/initial discharge capacity)×100

Table 1 shows the measured state of charge, expansion percentage, initial efficiency, and capacity retention ratio together with the density and shape of the negative electrode mixture layer.

TABLE 1

|  | Density of negative electrode mixture layer (g/cm$^3$) | Shape | State of charge (%) | Expansion percentage (%) | Initial efficiency (%) | Capacity retention ratio (%) |
| --- | --- | --- | --- | --- | --- | --- |
| Experimental Example 1 | 1.13 | solid | 40 | 152 | 68.2 | 0 |
| Experimental Example 2 | 1.86 | solid | 40 | 216 | 83.2 | 83 |
| Experimental Example 3 | 1.22 | pillar | 39 | 109 | 78 | 100 |

Figure 2A:
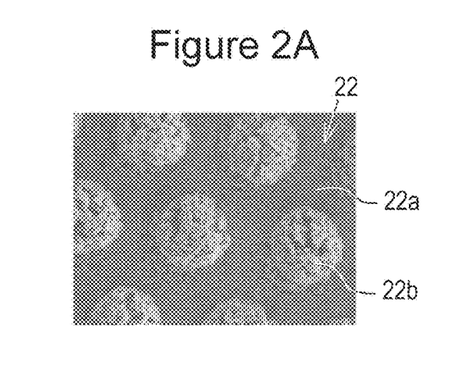
FIG. 2A is an electron micrograph (SEM) illustrating a negative electrode of Experimental Example 3 before initial charging and FIG. 2B is a SEM micrograph after the initial charging.
Figure 2B:
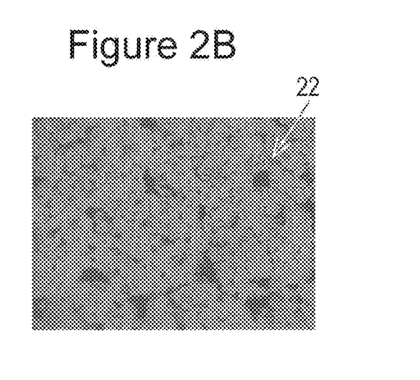
Figure 3A:
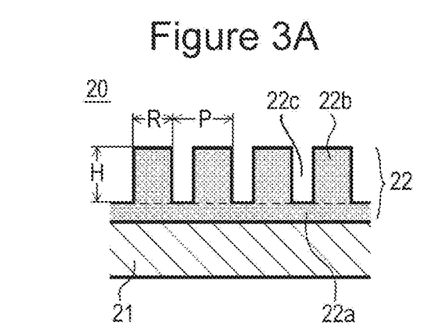
FIG. 3A is a schematic longitudinal-sectional view corresponding to FIG. 2A.
Figure 3B:
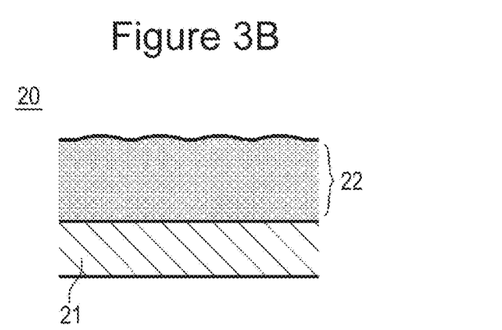
FIG. 3B is a schematic longitudinal-sectional view corresponding to FIG. 2B.
Figure 4A:
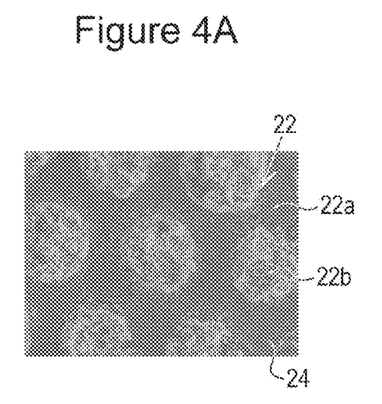
FIG. 4A is a SEM micrograph illustrating a portion corresponding to FIG. 2A after initial discharging and FIG. 4B is a SEM micrograph illustrating a portion corresponding to FIG. 2A after third-cycle discharging.
Figure 4B:
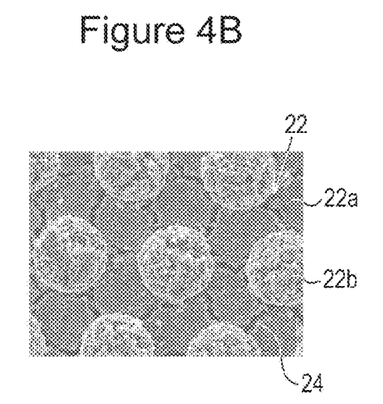

FIG. 2A is a SEM micrograph illustrating the negative electrode of Experimental Example 3 before the initial charging. FIG. 2B is a SEM micrograph after the initial charging. FIG. 3A is a schematic longitudinal-sectional view corresponding to FIG. 2A. FIG. 3B is a schematic longitudinal-sectional view corresponding to FIG. 2B. FIG. 4A is a SEM micrograph illustrating the negative electrode of Experimental Example 3 after the initial discharging. FIG. 4B is a SEM micrograph after the third-cycle discharging.

The following is found from the results shown in Table 1. Since the state of charge of the negative electrode of each of Experimental Examples 1 to 3 after the initial charging is about 40%, substantially the same charging state is achieved.

As the density of the negative electrode mixture layer increases, the initial efficiency also increases. The reason for this may be as follows. The presence of cavities formed by decreasing the density of the negative electrode mixture layer can reduce the expansion of the negative electrode active material during charging. However, it is difficult to ensure the electron conductivity between the negative electrode active material particles and the electron conductivity between the negative electrode active material particles and the negative electrode conducting agent, which results in decreases in the initial efficiency and the cycle characteristics.

Although the mixture density of the negative electrode mixture layer in the negative electrode of Experimental Example 3 is larger than that in the negative electrode of Experimental Example 1, the expansion percentage of the negative electrode of Experimental Example 3 is 109%, which is lower than that of the negative electrode of Experimental Example 1. The initial efficiency of the negative electrode of Experimental Example 3 is lower than that of the negative electrode of Experimental Example 2, but is higher than that of the negative electrode of Experimental Example 1. The cycle characteristics of the negative electrode of Experimental Example 3 are better than those of the negative electrodes of Experimental Examples 1 and 2. Thus, it is found that the negative electrode of Experimental Example 3 has a high initial efficiency despite a low mixture density and also has good cycle characteristics because the expansion during the charging is substantially suppressed.

[Specific Structure of Negative Electrode]

FIG. 2A is a SEM micrograph illustrating a negative electrode 20 of Experimental Example 3 before the initial charging. FIG. 2B is a SEM micrograph after the initial charging. FIG. 3A is a schematic longitudinal-sectional view corresponding to FIG. 2A. FIG. 3B is a schematic longitudinal-sectional view corresponding to FIG. 2B. FIG. 4A is a SEM micrograph illustrating the negative electrode of Experimental Example 3 after the initial discharging. FIG. 4B is a SEM micrograph after the third-cycle discharging.

As illustrated in FIG. 2A and FIG. 3A, the negative electrode 20 of Experimental Example 3 includes a negative electrode mixture layer 22 obtained by forming a base portion 22a having a particular thickness and made of a negative electrode mixture on a surface of a negative electrode current collector 21 and forming pillar-shaped portions 22b having substantially the same height and made of a negative electrode mixture on a surface of the base portion 22a. The pillar-shaped portions 22b are arranged in a staggered manner. The diameter L of the cross-section is 50 µm, the pitch P of the pillar-shaped portions 22b is 70 µm (the distance between the pillar-shaped portions 22b is 20 µm), and the height H of the pillar-shaped portions is 36 µm. When initial charging is performed in this state, as illustrated in FIG. 2B and FIG. 3B, negative electrode active material particles made of silicon in the negative electrode mixture layer 22 expand and the expansion of the negative electrode active material particles is absorbed by cavities 22c formed between the pillar-shaped portions 22b of the negative electrode mixture layer 22. Consequently, the height of the negative electrode mixture layer 22, that is, the thickness of the negative electrode mixture layer 22 does not considerably increase.

When initial discharging is performed in this state, a state illustrated in FIG. 4A is provided, which is substantially the same state as that before the initial charging. Herein, when FIG. 4A is carefully observed, it is confirmed that honeycomb-shaped fine cracks 24 are formed on the base portion 22a in a radial manner from pillar-shaped portions 22b toward other pillar-shaped portions 22b. The cracks 24 are formed by the expansion of the negative electrode active material particles in the negative electrode mixture layer 22 during charging.

It can be clearly confirmed from a SEM micrograph of the negative electrode 20 of Experimental Example 3 illustrated in FIG. 4B after the completion of third-cycle discharging that the width of the cracks 24 formed on the base portion 22a increases. The cracks 24 reduce the stress applied between the base portion and the negative electrode current collector 21 and the expansion of the pillar-shaped portions 22b reduces the stress applied to the current collector, which is believed to make it difficult to detach the negative electrode mixture layer 22 from the negative electrode current collector 21. In consideration of the effect of the cracks 24, the cracks 24 are not necessarily formed as a result of charging and discharging. The cracks 24 may be formed by suitably changing the die at the same time when the pillar-shaped portions 22b are formed.

By suitably adjusting the negative electrode mixture layer 22 within the following ranges, the cracks 24 on the base portion 22a are formed by charging and discharging. For example, the pitch of the pillar-shaped portions is 35 to 130 µm. The thickness of the base portion is 1 to 20 µm. The density of the pillar-shaped portions is 0.7 to 1.7 g/cm$^3$. The density of the base portion is 0.7 to 1.7 g/cm$^3$. The average density of the entire mixture layer is 0.6 to 1.0 g/cm$^3$. The average density of the entire mixture layer is calculated by including the cavities 22c formed between the pillar-shaped portions 22b in the volume of the mixture layer. The diameter of the pillar-shaped portions (R in FIG. 3) is 30 to 150 µm. The height of the pillar-shaped portions (H in FIG. 3) is 20 to 40 µm. The height/diameter ratio of the pillar-shaped portions is 0.1 to 2 and preferably 0.5 to 1.

The cracks 24 may be formed at the root of the pillar-shaped portions 22b while being formed in a radial manner from pillar-shaped portions 22b toward other pillar-shaped portions 22b.

By forming the pillar-shaped portions 22b in a staggered manner, the cavities 22c formed between the pillar-shaped portions 22b are effectively arranged. When the negative electrode active material particles expand, the inhibition against the expansion is reduced and the particles easily diffuse toward the cavities 22c. The expansion of the negative electrode active material particles is effectively absorbed by the cavities 22c. Thus, a plurality of the cracks 24 between the pillar-shaped portions 22b are formed in a radial manner. Consequently, the stress between the negative electrode active material particles and the stress between the negative electrode active material particles and the negative electrode current collector 21 are reduced, which is believed to result in achieving good cycle characteristics.

In the negative electrode 20, when the negative electrode active material particles expand during charging, the particles not only expand toward the cavities 22c between the pillar-shaped portions 22b, but also expand toward the inside of the pillar-shaped portions 22b. The negative electrode 20 contains a binder together with an active material. Therefore, the binder flexibly expands or shrinks, thereby uniformly forming the cracks 24 on the base portion 22a as illustrated in FIG. 3A and FIG. 3B. Consequently, the stress applied to the current collector is reduced.

Experimental Example 4

A negative electrode of Experimental Example 4 was produced using only a silicon powder with a thermal spraying apparatus in an Ar/He mixture atmosphere in order to confirm that the negative electrode active material is not only in the form of particles but also needs to contain a binder. The thermal spraying apparatus was operated under the conditions in which the current was 630 A, the flow rate of Ar was 70 L/min, the flow rate of He was 8 L/min, the thermal spraying distance was 300 mm, and the state of charge was 35%.

Two-cycle charging and discharging were performed using the negative electrode of Experimental Example 4 under the same conditions as those of the above-described case. The density of the negative electrode active material layer, the state of charge, the initial discharge capacity, and the second-cycle discharge capacity were measured, and the second-cycle capacity retention ratio was determined on the basis of the above calculation formula. Table 2 collectively shows the measurement results regarding the density of the negative electrode active material layer, the state of charge, and the second-cycle capacity retention ratio, together with the second-cycle results of the negative electrode of Experimental Example 3.

TABLE 2

| | Density of negative electrode mixture layer (g/cm$^3$) | State of charge (%) | Capacity retention ratio (%) |
|---|---|---|---|
| Experimental Example 3 | 1.22 | 39 | 100 |
| Experimental Example 4 | 0.4 | 35 | 58 |

The following is found from the results shown in Table 2. Since there is substantially no difference between the state of charge of the negative electrode of Experimental Example 4 and the state of charge of the negative electrode of Experimental Example 3 at the initial charging, both the negative electrodes have substantially the same charge state. All results show that the second-cycle capacity retention ratio of the negative electrode of Experimental Example 4 is lower than that of the negative electrode of Experimental Example 3.

In the negative electrode of Experimental Example 3, the silicon particles serving as a negative electrode active material and the polyimide resin serving as a binder are used. Therefore, contacts between the negative electrode active material particles are kept and good electron conductivity can be maintained. Consequently, the capacity retention ratio with cycles is believed to be high.

EXPERIMENT 2

Experimental Example 5

The same negative electrode as that of Experimental Example 1 in Experiment 1 was used as a negative electrode of Experimental Example 5. The average density of the entire negative electrode mixture layer was 0.7 g/cm$^3$. The average density was calculated by including the cavities formed between the pillar-shaped portions in the volume of the mixture layer. The percentage r/R obtained by dividing the particle diameter r=2.3 μm of the negative electrode active material particles by the maximum diameter R=50 μm of the pillar-shaped portions was 4.6%.

Experimental Example 6

A negative electrode of Experimental Example 6 was produced in the same manner as in Experimental Example 1, except that silicon particles having an average particle diameter ($D_{50}$) of 3 μm were used as the negative electrode active material in the negative electrode mixture slurry. The average density of the entire negative electrode mixture layer in the negative electrode of Experimental Example 2 was 0.7 g/cm$^3$. The percentage r/R obtained by dividing the particle diameter r=3 μm of the negative electrode active material particles by the maximum diameter R=50 μm of the pillar-shaped portions was 6%.

Experimental Example 7

A negative electrode of Experimental Example 3 was produced in the same manner as in Experimental Example 1, except that silicon particles having an average particle diameter ($D_{50}$) of 6 μm were used as the negative electrode active material in the negative electrode mixture slurry. The average density of the entire negative electrode mixture layer in the negative electrode of Experimental Example 3 was 0.6 g/cm$^3$. The percentage r/R obtained by dividing the particle diameter r=6 μm of the negative electrode active material particles by the maximum diameter R=50 μm of the pillar-shaped portions was 12%.

Experimental Example 8

A negative electrode of Experimental Example 4 was produced in the same manner as in Experimental Example 1, except that silicon particles having an average particle diameter ($D_{50}$) of 10 μm were used as the negative electrode active material in the negative electrode mixture slurry. Although the pillar-shaped portions in the negative electrode of Experimental Example 4 were partly chipped, the average density of the entire negative electrode mixture layer in the negative electrode of Experimental Example 4 was 0.6 g/cm$^3$. The percentage r/R obtained by dividing the particle diameter r=10 μm of the negative electrode active material particles by the maximum diameter R=50 μm of the pillar-shaped portions was 20%.

Experimental Example 9

A negative electrode of Experimental Example 5 was produced in the same manner as in Experimental Example 1, except that silicon particles having an average particle diameter ($D_{50}$) of 15 μm were used as the negative electrode active material in the negative electrode mixture slurry. In Example 5, the pillar-shaped portions were not formed. Therefore, it was impossible to calculate the average density of the entire negative electrode mixture layer and the percentage r/R obtained by dividing the particle diameter r=15 μm of the negative electrode active material particles by the maximum diameter R=50 μm of the pillar-shaped portions.

(Measurement of Monopolar Characteristics)

A monopolar cell 10 corresponding to the negative electrode of each of Experimental Examples 5 to 9 was produced under the same conditions as those of Experimental Examples 1 to 3 in Experiment 1, except that the above-described negative electrode was used. A charge-discharge cycle test was performed under the following conditions. First, charging was performed at a constant current of 0.3 mA until the voltage reached 90 my vs. Li/Li$^+$, and the quantity of electricity that flowed herein was determined as an initial charge capacity. Furthermore, the thickness of the negative electrode mixture layer after the initial charging was measured with a micrometer. The state of charge was about 40%. Subsequently, discharging was performed at a constant current of 0.3 mA until the voltage reached 1000 my vs. Li/Li$^+$, and the quantity of electricity that flowed herein was determined as an initial discharge capacity. Furthermore, the thickness of the negative electrode mixture layer after the initial discharging was measured with a micrometer. The expansion percentage was determined on the basis of the calculation formula below.

Expansion percentage(%)

=(thickness of negative electrode mixture layer after initial charging/thickness of negative electrode mixture layer after initial discharging)×100

The monopolar cell 10 of each of Experimental Examples 5 to 9 in which the initial discharge capacity was measured was repeatedly subjected to charging and discharging under the same charge-discharge conditions as the initial charge-discharge conditions to determine the second-cycle discharge capacity and the tenth-cycle discharge capacity. The initial cycle index was calculated on the basis of the calculation formula below.

Initial cycle index(%)

=(tenth-cycle discharge capacity/second-cycle discharge capacity)×100

Table 3 collectively shows the measured initial cycle index and expansion percentage in Experimental Examples 5 to 9, together with the average density of the negative electrode active material layer and the moldability of the pillar-shaped portions. The moldability was evaluated to be "poor" when the pillar-shaped portions were not sufficiently formed, "good" when the pillar-shaped portions were formed in a stable shape, and "excellent" when the pillar-shaped portions were formed in a more stable shape. The shape of the pillar-shaped portions of the negative electrode active material layer was checked by SEM observation.

TABLE 3

| | Particle diameter r (μm) | Maximum diameter of pillar-shaped portions R (μm) | r/R (%) | Average density (g/cm³) | Moldability | Initial cycle index (%) | Expansion percentage (%) |
|---|---|---|---|---|---|---|---|
| Experimental Example 5 | 2.3 | 50 | 4.6 | 0.7 | Excellent | 95 | 145 |
| Experimental Example 6 | 3 | 50 | 6 | 0.7 | Excellent | 90 | 148 |
| Experimental Example 7 | 6 | 50 | 12 | 0.6 | Excellent | 91 | 150 |
| Experimental Example 8 | 10 | 50 | 20 | 0.6 | Good | 87 | 155 |
| Experimental Example 9 | 15 | 50 | 30 | — | Poor | — | — |

The following is found from the results shown in Table 1. The state of charge of each of the negative electrodes of Experimental Examples 5 to 9 during the initial charging is about 40%, and the negative electrodes have substantially the same charge state. The negative electrodes of Experimental Examples 5 to 8 have the same tendency as in FIG. 2 to FIG. 4 that illustrate the negative electrode 20 of Experimental Example 1.

As a result of the comparison of the results of the moldability in Experimental Examples 5 to 9, "excellent" is given in Experimental Examples 5 to 7 and "good" is given in Experimental Example 8 whereas "poor" is given in Experimental Example 9 because the pillar-shaped portions are substantially not formed. The percentage r/R is 20% or less in Experimental Examples 5 to 8 whereas the percentage r/R is more than 20% in Experimental Example 9. Therefore, it is found that when r/R is 20% or less, good moldability of the pillar-shaped portions is achieved.

In particular, in Experimental Examples 5 to 7 in which the moldability is "excellent", r/R is 12% or less. Therefore, it is found that, by controlling r/R between 12% in Experimental Example 3 and 20% in Experimental Example 4, that is, by controlling r/R to be 15% or less, the moldability of the pillar-shaped portions is improved compared with the case where r/R is outside the above range. This may be because, when the percentage r/R of the particle diameter r of the negative electrode active material particles relative to the maximum diameter R of the pillar-shaped portions increases, the percentage of the negative electrode active material particles that are in contact with each other decreases, and the negative electrode active material particles are not easily intertwined (the bond is weakened), which degrades the moldability.

If the particle diameter of the negative electrode active material is less than 2 μm, the specific surface area of the negative electrode active material is larger than that in the case where the particle diameter is outside the above range. This increases the reactivity with the nonaqueous electrolytic solution and facilitates the oxidation of the negative electrode active material, which degrades the cycle characteristics. Therefore, the particle diameter of the negative electrode active material is preferably 2 μm or more and less than 20 μm and more preferably 2 μm or more and 15 μm or less.

The initial cycle index is 87% or more in Experimental Examples 5 to 8. In Experimental Examples 5 to 8, the pillar-shaped portions are formed in a more or less stable shape. Therefore, it is found that good cycle characteristics are achieved by improving the moldability of the pillar-shaped portions by controlling r/R to be 20% or less.

In particular, the initial cycle index is 90% or more in Experimental Examples 5 to 7. In Experimental Examples 5 to 7, the pillar-shaped portions are formed in a more stable shape than those in Experimental Example 8. Therefore, it is found that better cycle characteristics are achieved by further improving the moldability of the pillar-shaped portions by controlling r/R to be 15% or less.

The expansion percentage decreases in the order of Experimental Example 8, Experimental Example 7, Experimental Example 6, and Experimental Example 5. The particle diameter of the negative electrode active material decreases in that order. Therefore, it is found that the negative electrode mixture layer does not easily expand as the particle diameter of the negative electrode active material decreases.

In the above-described embodiment, the case where the pillar-shaped portions 22b have a round pillar shape has been described, but the shape of the pillar-shaped portions 22b may be a polygonal prism such as a quadrangular prism, a pentagonal prism, or a hexagonal prism and the corners may be chamfered. When the shape of the pillar-shaped portions 22b is a polygonal prism, the maximum diameter R can be calculated as a diameter of a circumcircle of the cross-section.

In Experimental Examples 1 to 3 and 5 to 9, the case where the polyimide resin formed from a polyamic acid resin is used as a binder has been described, but the same effects are produced even when a well-known polyimide resin is used from the beginning. A binder composed of another compound commonly used in negative electrodes for nonaqueous electrolyte secondary batteries may also be used. When the polyimide resin is used as a binder, the negative electrode active material particles are bonded to each other using the polyimide resin having a high elastic modulus. Therefore, the negative electrode active material particles can flexibly expand toward the inside of the pillar-shaped portions and the cavities between the pillar-shaped portions during charging compared with the case where the polyimide resin is not used. Consequently, the damage to the electrode structure such as isolation of the negative electrode active material particles can be satisfactorily suppressed.

In Experimental Examples 1 to 9, the case where the silicon particles are used as the negative electrode active material has been described, but a material that forms an alloy with lithium, such as germanium, tin, or zinc, may be used instead of silicon. In Experimental Examples 1 to 3 and 5 to 9, the case where the silicon particles having an average particle diameter ($D_{50}$) of 2.3 μm are used as the negative electrode active material has been described, but the average particle diameter ($D_{50}$) of the silicon particles is preferably 13 μm or less and more preferably 6 μm or less, and preferably 2 μm or more. An excessively large particle diameter of the silicon particles makes it difficult to form the pillar-shaped portions. If the particle diameter of the silicon particles is small, the specific surface area increases. This increases the reactivity with the nonaqueous electrolytic solution and facilitates the oxidation of the negative electrode active material, which degrades the cycle characteristics.

A positive electrode, a nonaqueous electrolyte, and a separator that can be used in the nonaqueous electrolyte secondary battery according to the present invention will be described below as an example.

[Positive Electrode]

The positive electrode suitably includes a positive electrode current collector and a positive electrode active material layer formed on the positive electrode current collector. The positive electrode active material layer preferably contains a conductive material and a binding agent in addition to a positive electrode active material. The positive electrode active material is not particularly limited, but is preferably a lithium transition metal oxide. The lithium transition metal oxide may contain a non-transition metal element such as Mg or Al. Specific examples of the lithium transition metal oxide include lithium cobaltate, olivine lithium phosphate such as lithium iron phosphate, and lithium transition metal oxides such as Ni—Co—Mn, Ni—Mn—Al, and Ni—Co—Al. These positive electrode active materials may be used alone or in combination of two or more.

[Nonaqueous Electrolyte]

The nonaqueous electrolyte contains a nonaqueous solvent and an electrolyte salt dissolved in the nonaqueous solvent. The nonaqueous electrolyte is not limited to a liquid electrolyte (nonaqueous electrolytic solution), and may be a solid electrolyte that uses a gel polymer or the like. The nonaqueous solvent may be, for example, an ester, an ether, a nitrile (e.g., acetonitrile), or an amide (e.g., dimethylformamide) or a mixed solvent containing two or more of the foregoing. At least a cyclic carbonate is preferably used as the nonaqueous solvent, and both a cyclic carbonate and a chain carbonate are more preferably used. The nonaqueous solvent may also be a halogen substitution product obtained by substituting hydrogen atoms of a solvent with halogen atoms such as fluorine atoms.

The electrolyte salt is preferably a lithium salt. Examples of the lithium salt include $LiPF_6$, $LiBF_4$, $LiAsF_6$, $LiN(SO_2CF_3)_2$, $LiN(SO_2CF_5)_2$, and $LiPF_{6-x}(C_nF_{2n+1})_x$ ($1<x<6$, n: 1 or 2). These lithium salts may be used alone or in combination of two or more. The concentration of the lithium salt is preferably 0.8 to 1.8 mol per 1 of the nonaqueous solvent.

[Separator]

A porous sheet having ion permeability and an insulating property is used as the separator. Specific examples of the porous sheet include microporous membranes, woven fabrics, and nonwoven fabrics. The separator is suitably made of a polyolefin such as polyethylene or polypropylene. The separator is interposed between the positive electrode and the negative electrode.

INDUSTRIAL APPLICABILITY

The negative electrode for nonaqueous electrolyte secondary batteries according to one aspect of the present invention and the nonaqueous electrolyte secondary battery that uses the negative electrode can be applied to drive power supplies for mobile information terminals, such as cellular phones, notebook computers, and PDAs, that are particularly required to have high energy density. They are also promising for high-output uses such as electric vehicles (EVs), hybrid electric vehicles (HEVs or PHEVs), and power tools.

REFERENCE SIGNS LIST 10 monopolar cell
11 negative electrode
12 counter electrode (positive electrode)
13 separator
14 measurement cell
15 reference electrode
16 reference electrode cell
17 capillary
18 nonaqueous electrolytic solution
20 negative electrode
21 negative electrode current collector
22 negative electrode mixture layer
22a base portion
22b pillar-shaped portion
22c cavity
24 crack

The invention claimed is:

1. A negative electrode for a nonaqueous electrolyte secondary battery, comprising:
   a current collector; and
   a negative electrode mixture layer formed on the current collector and containing a binder and a negative electrode active material particle that forms an alloy with lithium,
   wherein the negative electrode mixture layer includes pillar-shaped portions, and the pillar-shaped portions are formed on a base portion near the current collector, wherein cracks are formed on the base portion of the negative electrode mixture layer.

2. The negative electrode for a nonaqueous electrolyte secondary battery according to claim 1, wherein the cracks are formed so as to connect the pillar-shaped portions to each other.

3. The negative electrode for a nonaqueous electrolyte secondary battery according to claim 1, wherein the pillar-shaped portions are formed in a staggered manner.

4. The negative electrode for a nonaqueous electrolyte secondary battery according to claim 1, wherein a particle diameter of the negative electrode active material particle is 20% or less of the maximum diameter of the pillar-shaped portions.

5. The negative electrode for a nonaqueous electrolyte secondary battery according to claim 4, wherein the particle diameter of the negative electrode active material particle is 2 μm or more and 10 μm or less.

6. The negative electrode for a nonaqueous electrolyte secondary battery according to claim 1, wherein the negative electrode active material particle is a particle containing Si.

7. The negative electrode for a nonaqueous electrolyte secondary battery according to claim 1, wherein the binder is polyimide.

8. The negative electrode for a nonaqueous electrolyte secondary battery according to claim 1, wherein the pitch of the pillar-shaped portions is 35 to 130 μm.

9. The negative electrode for a nonaqueous electrolyte secondary battery according to claim 1, wherein average density of the negative electrode mixture layer is 0.6 to 1.0 g/cm$^3$.

10. A negative electrode for a nonaqueous electrolyte secondary battery, comprising:
    a current collector; and
    a negative electrode mixture layer formed on the current collector and containing a binder and a negative electrode active material particle that forms an alloy with lithium,
    wherein the negative electrode mixture layer includes pillar-shaped portions, and
    the pillar-shaped portions are formed on a base portion near the current collector,
    wherein cracks are formed on the base portion of the negative electrode mixture layer, and
    wherein the binder is polyimide.

11. The negative electrode for a nonaqueous electrolyte secondary battery according to claim 10, wherein a particle diameter of the negative electrode active material particle is 20% or less of the maximum diameter of the pillar-shaped portions.

12. The negative electrode for a nonaqueous electrolyte secondary battery according to claim 10, wherein the particle diameter of the negative electrode active material particle is 2 μm or more and 10 μm or less.

13. The negative electrode for a nonaqueous electrolyte secondary battery according to claim 10, wherein the negative electrode active material particle is a particle containing Si.

14. The negative electrode for a nonaqueous electrolyte secondary battery according to claim 10, wherein the pitch of the pillar-shaped portions is 35 to 130 μm.

15. The negative electrode for a nonaqueous electrolyte secondary battery according to claim 10, wherein average density of the negative electrode mixture layer is 0.6 to 1.0 g/cm$^3$.

16. A negative electrode for a nonaqueous electrolyte secondary battery, comprising:
    a current collector; and
    a negative electrode mixture layer formed on the current collector and containing a binder and a negative electrode active material particle that forms an alloy with lithium,
    wherein the negative electrode mixture layer includes pillar-shaped portions, and
    the pillar-shaped portions are formed on a base portion near the current collector, wherein cracks are formed on the base portion of the negative electrode mixture layer; and
    wherein the pitch of the pillar-shaped portions is 35 to 130 μm.

17. The negative electrode for a nonaqueous electrolyte secondary battery according to claim 16, wherein a particle diameter of the negative electrode active material particle is 20% or less of the maximum diameter of the pillar-shaped portions.

18. The negative electrode for a nonaqueous electrolyte secondary battery according to claim 16, wherein the particle diameter of the negative electrode active material particle is 2 μm or more and 10 μm or less.

19. The negative electrode for a nonaqueous electrolyte secondary battery according to claim 16, wherein the negative electrode active material particle is a particle containing Si.

20. The negative electrode for a nonaqueous electrolyte secondary battery according to claim 16, wherein average density of the negative electrode mixture layer is 0.6 to 1.0 g/cm$^3$.

* * * * *